United States Patent Office 3,298,982
Patented Jan. 17, 1967

3,298,982
SOIL TREATMENT COMPOSITIONS COMPRISING POLYMER SALT, PETROLEUM OIL AND CARBOXYLIC ACID SALT
John H. Glenn, Torrance, and George M. Brown, Los Angeles, Calif., assignors to Brown Mud Company, Torrance, Calif., a corporation of California
No Drawing. Original application Jan. 13, 1958, Ser. No. 708,386, now Patent No. 3,124,934, dated Mar. 7, 1964. Divided and this application Aug. 12, 1963, Ser. No. 305,912
6 Claims. (Cl. 260—23)

This is a division of U.S. patent application Serial No. 708,386, filed January 13, 1958, now Patent No. 3,124,-934 issued March 7, 1964.

This invention relates to soil treatment and more particularly to a composition of matter for treating a waterway, e.g. canal, lake, reservoir, irrigation ditch, for the purpose of rendering the soil bed of the waterway less permeable to water.

The invention is of especial economic consequence when applied to canals and irrigation ditches in arid areas. In California, for example, canals which are miles long are employed to convey irrigation water. It is economically prohibitive to line the walls of these canals as with concrete or asphalt compositions; yet, if no steps are taken to substantially reduce seepage of water through the soil beds of unlined canals and of irrigation ditches, the loss of water becomes so great as to amount to wantonness when in areas where water conservation practices of necessity must be observed.

Attempts have been made to conserve water in irrigation canals by treating the canal bed with bentonitic materials, but it turns out that the use of such materials is unsatisfactory for several significant reasons. The use of solid material of bentonitic nature involves a difficult mixing procedure as these materials absorb water with the formation of large lumps of dry material. The lumps are sticky and are hard to break up. Heavy and expensive equipment and machinery are needed to handle bentonite. To employ bentonitic material it is usually necessary to use chemical dispersants, but dispersant materials cause the bentonitic particles to hydrate and swell before entry into the porous soil or sand. The hydrating and resulting swelling properties of bentonitic particles are destroyed by the presence of calcium and magnesium salts which are usually present in irrigation waters with the result that the bentonitic particles become ineffective for sealing purposes. To use bentonitic materials normal operation of the waterway must usually be suspended during the treatment and in some cases the waterway must be drained in order to effect substantial reduction in water permeability of the water bed with the use of bentonite.

Other attempts to seal the soil beds of unlined waterways have been made using polyacrylates; however, it was found that the calcium and magnesium ions present in natural waters combined with the polyacrylate to form water insoluble flocs which did not penetrate the silt and soil of the bed of the waterways and hence did not provide a satisfactory seal.

We have found that the soil beds of waterways may be rendered substantially impermeable to water with the use of a water-in-oil emulsion formed by the addition of an emulsifier, hereinafter more fully described, to petroleum hydrocarbon oil and water. The emulsion being a liquid, no special equipment or machinery is needed to treat the bed of the waterway according to this invention. The emulsion disperses readily and is sufficiently stable in the presence of calcium and magnesium salts to allow the components thereof to penetrate into the soil without change or reaction. The waterway may be treated with the emulsion during normal operation of the waterway. Furthermore, by this invention, the soil bed of a waterway acquires a high degree of resistance to stream erosion.

In treating a canal or irrigation ditch according to the method of this invention, the aforesaid emulsion may be added to the water of the waterway at a rate of at least about 150 parts by weight of the emulsion to one million parts of water for a treating period of about two days' time. Of course, where the treating period is extended the concentration may be lowered generally proportionally. When new canals, irrigation ditches, ponds or other waterways are dug and before they are opened to the flow of water, the emulsion may be spread on the surface of the bed of the waterway at a rate of at least about 0.005 pound of emulsion per square foot of soil, and if desired, the bed may be tilled. Such amount represents the equivalent of treatment by adding the emulsion to the water of the waterway in the concentration mentioned above. Ponds, lakes and reservoirs may be treated by spraying the emulsion of this invention on the surface of the water.

The water-in-oil emulsion of this invention may be formed by mixing the emulsifier in petroleum hydrocarbon oil and then neutralizing the mixture by the addition thereto of a water solution of an alkaline agent such as sodium hydroxide, potassium hydroxide, ammonium hydroxide, sodium carbonate, sodium silicate, etc. The water-in-oil emulsion so formed may be stabilized by the addition thereto of an electrolyte such as sodium chloride.

The liquid petroleum hydrocarbon oil mentioned above is preferably a low viscosity light colored highly refined oil having a gravity of 40° A.P.I. or less, and that will not be toxic to plant life, such as a spraying oil sanctioned by State or regional agricultural departments, or a good grade of kerosene, diesel fuel, or lube stock.

One group of chemicals that may be employed, according to this invention, as the emulsifier, is the fatty acids having a chain length of from 16 to 18 carbon atoms and preferably with at least one unsaturated or double bond in the chain. Another emulsifier is rosin acid, i.e. commercial abietic acid. An economical product which may be used as the emulsifier is tall oil, i.e. the acidified skimmings of waste black liquor from the sulfate wood pulp digestion skimmings of paper making. Such tall oil comprises linoleic and oleic acids. These emulsifying chemicals are soluble in the petroleum hydrocarbon oils, and can be neutralized in the petroleum hydrocarbon oil by the addition to the mixture of an aqueous solution of an alkaline agent. Such neutralization is carried out until a five to one dilution of the emulsion in distilled water (five volumes of water to one volume of emulsion) has a pH of from about 9 to 10.5, the optimum pH being about 9.7.

A water-in-oil emulsion proving especially advantageous according to this invention may be produced by mixing 7 to 8 parts by weight of the fatty or the rosin acid with 84 to 87 parts by weight of the petroleum hydrocarbon oil, and then neutralizing the mixture by the addition of 0.8 to 0.9 part by weight of sodium hydroxide in 6 to 7 parts by weight of water. When thus formed, the emulsion may thereafter be stabilized by the addition of 0.1 to 0.6 part by weight of sodium chloride. When the emulsion is diluted 5 times with distilled water, it should have a pH of from 9.0 to 10.5.

Our explanation for the sealing effect produced by this invention is as follows: The organic alkali metal or ammonium salts formed in the petroleum hydrocarbon oil by neutralization are resistant to reaction with calcium and magnesium ions when the emulsion is added to hard water. This unique characteristic of such salts makes it possible that they be carried by the water of a waterway into the soil bed of the waterway before they are reacted upon by the calcium and magnesium ions. The salts are surface active, and as they are carried into the soil bed by seepage of the water in the waterway, they adhere to the sand and silt particles of the bed where they may then react with the calcium and magnesium ions in the water to form insoluble calcium and magnesium salts which absorb water and thus fill the spaces between sand particles in the bed of the waterway. Sufficient calcium and magnesium ions are normally present in natural waters and soils to replace the sodium in the organic salts to complete the reaction in a period of several days.

We have found further, according to this invention, that hydrocarbon polymers or copolymers, e.g. sodium polyacrylate in a water solution may be mixed with the water-in-oil emulsion described above to form a stable oil-in-water emulsion which is capable of infinite dilution in hard water without immediate reaction with calcium or magnesium ions, i.e. both the polymer salts and the salts of the water-in-oil emulsion are retarded in their reaction with calcium and magnesium ions. This permits the polymer salts to be carried by the water of the waterway into the soil bed so that sealing occurs in the soil and not merely on the surface thereof where it would be subject to erosion with consequent loss of seal.

The polymers or copolymers employed in accordance with this invention are those referred to in U.S. Patent No. 2,718,497, as being "any linear hydrocarbon chain polymer or copolymer of relatively high molecular weight in which hydrophilic acid or acid-forming groups are present in amounts corresponding to one such hydrophilic group for each 2 to 3 carbon atoms of the linear hydrocarbon chain so that a hydrolyzed product containing one carboxylic acid salt group for each 2 to 6 linear chain carbon atoms can be obtained by hydrolyzing at least 50% of the acid-forming groups to carboxyls," and further as "a linear hydrocarbon chain polymer having a molecular weight greater than 10,000 and containing carboxylic acid salt groups selected from the group consisting of the alkali metal and ammonium salts in a ratio of one carboxylic salt group to each two to six linear chain carbon atoms." Preferred polymers are the polymerized salts of the acrylic acids, an example of which is sodium polyacrylate. As mentioned above, attempts have been made to use such polymers or copolymers as ionic sealers for waterways, but it was found that they immediately precipitated out from the water. By this invention, however, a protective colloid is provided for the polymers, the colloid serving to prevent immediate flocculation.

To form the oil-in-water emulsion of this invention, which includes the aforesaid polymers, the fatty or rosin acid-petroleum hydrocarbon oil emulsion referred to above may be added to a water solution of the polymer to form a stable oil-in-water emulsion. The concentration of the polymer-water solution is preferably not greater than 3 parts by weight of polymer to 100 parts by weight of water. Solutions of higher concentrations are too thick for easy mixing. When such polymer solution is mixed with the emulsion in the ratio of about 7 parts by weight of emulsion to 8 parts by weight of the solution, the resulting oil-in-water emulsion will contain 38 to 40 parts by weight of liquid petroleum hydrocarbon oil, 3 to 5 parts by weight of fatty and/or rosin acids, 0.3 to 0.5 part by weight of alkaline agent, 0.3 to 1.7 parts by weight of the polymers, 0.05 to 0.3 part by weight of an emulsion stabilizing electrolyte and 48 to 60 parts by weight of water. The water-in-oil emulsion should be added to the polymer-water solution to prevent the formation of a thick gelatinous mass, especially where relatively higher concentrations of the polymer solution than those mentioned above are used, and the polymer solution should preferably be at least about equal to the amount of the emulsion so that water constitutes the continuous phase of the mixture throughout the mixing process and infinite dilution is made possible in the water of the waterway.

We have produced commercially usable quantities of the oil-in-water emulsion according to the following continuous manufacturing process: Crude tall oil, at the rate of 435 lbs. per hour, and petroleum oil, at the rate of 5,000 lbs. per hour, are mixed together in a blender. From the blender the tall oil-petroleum oil mixture is passed into a neutralizer to which 20% caustic is added at the rate of 219 lbs. per hour. The liquids in the neutralizer are subject to continuous and vigorous agitation to prevent formation of curds. The water-in-oil emulsion formed in the neutralizer is passed into another blender where it is mixed with a polymer in water solution. Such polymer in water solution is formed by dissolving commercial sodium polyacrylate (identified commercially as "KH-3") at the rate of 130 lbs. per hour in water supplied to the dissolver at the rate of 6620 lbs. per hour. The resulting oil-in-water emulsion is produced at the rate of 12,404 lbs. per hour.

For the purpose of illustrating the sealing effect produced from application of the above described emulsions to soils, the following specific examples of the practice of this invention are set forth.

*Example 1*

A water-in-oil emulsion was prepared by mixing the following: 7.87 grams of tall oil, 0.90 gram of sodium hydroxide, 87.46 grams of diesel oil, 3.64 grams of water, and 0.15 gram of sodium chloride. The emulsion was then mixed with water, having a hardness of 50 grains per gallon expressed as calcium carbonate, sufficient water being used to provide a suspension having a concentration of 5600 parts by weight of the emulsion per million parts by weight of the water.

A core of soil to be subjected to treatment was formed by tamping a soil specimen into a cylinder, enough soil being present to provide a soil core four inches in height. The core was allowed to stand with a head of 54 inches of water over it. Water passing through the core was collected and measured and found to represent a seepage loss rate of 2.83 cubic feet of water per square foot of soil per day (hereinafter referred to as "c.f.d.").

After measuring the seepage loss rate of the soil specimen, the core was subjected to treatment with the above specified suspension by replacing the water above the core with said suspension. The core in contact with the suspension was allowed to stand for forty-five hours at the end of which time treatment was terminated by displacing the suspension with clear hard water. It was determined that 0.12 pound of the water-in-oil emulsion per square foot of the core surface had entered the core.

Measurements were then made to determine the seepage loss rates over a period of two weeks. Within twenty-four hours after the treatment was removed, the seepage loss rate had decreased to 0.15 c.f.d. representing a decrease of 94.7% in loss rate. The seepage loss rate decreased to a minimum of 0.11 c.f.d., i.e. a decrease of 96.2%.

Example 2

A soil core having a seepage loss rate of 5.09 c.f.d. was treated with a suspension of 5600 parts by weight of an oil-in-water emulsion per million parts of water with a hardness of 50 grains per gallon expressed as calcium carbonate. The oil-in-water emulsion consisted of 3.61 grams of fatty and rosin acids, 40.18 grams of diesel oil, 0.42 grams of sodium hydroxide, 55.26 grams of water, and 0.54 grams of commercial sodium polyacrylate (identified commercially as "KH-3"). Said fatty and rosin acids combined consisted of a mixture of the following: 42% by weight of abietic acid, 24.5% oleic acid, 23% linoleic acid, 6% palmitic acid, 0.5% linolenic acid, and 2% unsaponifiables. The suspension was left in contact with the core for eight hours before it was replaced with the hard water. During this time, 0.05 pounds of the emulsion per square foot of the core surface entered the core. Within forty-two hours after the treatment was removed, the seepage loss rate had decreased to 0.18 c.f.d., or a decrease of 94.5%. The seepage loss rate of the core was observed daily for three weeks, and a minimum loss rate of 0.068 c.f.d. was observed. This amounted to a 98.8% reduction in loss rate.

Example 3

A soil core having a seepage loss rate of 8.05 c.f.d. was treated with a suspension of 1100 parts by weight of an oil-in-water emulsion per million parts of water with a hardness of 10 grains per gallon expressed as calcium carbonate. This oil-in-water emulsion consisted of 2.94 grams of oleic acid, 40.40 grams of diesel oil, 0.44 grams of sodium hydroxide, 55.62 grams of water, and 0.54 grams of a commercial sodium polyacrylate. The suspension was left in contact with the core for twenty-four hours before being replaced with the original clear water. The seepage loss rate decreased steadily to 0.34 c.f.d., a reduction of 95.8%.

Example 4

A soil core having a seepage loss rate of 8.30 c.f.d. was treated with a suspension of 1100 parts by weight of an oil-in-water emulsion per million parts of water with a hardness of 10 grains per gallon expressed as calcium carbonate. This oil-in-water emulsion was comprised of 3.33 grams of commercial grade abietic acid, 40.13 grams of diesel oil, 0.49 grams of sodium hydroxide, 0.54 grams of commercial sodium polyacrylate and 55.52 grams of water. The suspension was left in contact with the core for twenty-four hours before being replaced with the original clear water. The seepage loss rate decreased steadily to 0.54 c.f.d., a reduction of 93.5%.

Example 5

A soil core having a seepage loss rate of 4.05 c.f.d. was treated with a suspension of 1100 parts by weight of an oil-in-water emulsion per million parts of water with a hardness of 10 grains per gallon expressed as calcium carbonate. This oil-in-water emulsion was comprised of 3.49 grams of commercial grade of linoleic acid (48%), 40.21 grams of diesel oil, 0.43 grams of sodium hydroxide, 0.54 grams of commercial sodium polyacrylate and 55.36 grams of water. The suspension was left in contact with the core for twenty-four hours before being replaced with the original clear water. The seepage loss rate decreased steadily to 0.31 c.f.d., a reduction of 92.1%.

Example 6

A soil core having a seepage loss rate of 5.93 c.f.d. was treated with a suspension of 1100 parts by weight of an oil-in-water emulsion per million parts of water with a hardness of 10 grains per gallon expressed as calcium carbonate. This oil-in-water emulsion was comprised of 3.52 grams of tall oil, 40.62 grams of diesel oil, 1.15 grams of concentrated ammonium hydroxide, 0.54 grams of commercial sodium polyacrylate and 54.16 grams of water. The suspension was left in contact with the core for twenty-four hours before being replaced with clear water. The seepage loss rate decreased steadily to 0.57 c.f.d., a reduction of 90.4%.

Example 7

A soil core having a seepage loss rate of 41.76 c.f.d. was treated with a suspension of 2500 parts by weight of an oil-in-water emulsion per million parts of water with a hardness of 50 grains per gallon expressed as calcium carbonate. The emulsion was formed of 3.55 grams of tall oil, 40.12 grams of kerosene, 0.45 grams of sodium hydroxide, 0.54 grams of commercial sodium polyacrylate, 0.13 grams of sodium chloride, and 55.20 grams of water. The suspension was left in contact with the core for twenty-four hours before being replaced with clear water. The seepage loss rate decreased to 0.06 c.f.d., representing a reduction of 99.9%.

Example 8

A section of actual canal bottom was isolated by driving a 42 inch diameter casing two feet into the bottom of the canal. The seepage loss rate of this isolated section was measured by noting the amount of water necessary to maintain a constant level inside the casing. This section was then treated with an oil-in-water emulsion which consisted of 3.59 grams of tail oil, 0.43 grams of caustic soda, 39.97 grams of diesel oil, 1.06 grams of a commercial sodium polyacrylate, and 54.94 grams of water. The amounts of materials used and results obtained are shown in the table which follows Example 10. After a satisfactory seal was obtained, the soil bottom of the canal inside the casing was stirred up and punctured with a pole to a depth of about 3 to 6 inches and a water jet from a pump was used to erode the surface of the bottom. The seepage loss rate increased temporarily and then slowed down after the agitation, indicating that any holes which may have been made in the seal became plugged.

Example 9

The test of Example 8 was repeated with a different concentration of the oil-in-water emulsion, and similar results were obtained. In this example the soil bottom was disturbed by means of a water jet only. The results of this test are shown in the table following Example 10.

Example 10

The test of Example 8 was repeated except for the agitation so that control test data for Examples 8 and 9 was available.

|  | Example 8 | Example 9 | Example 10 |
|---|---|---|---|
| Area of casing, sq. ft. | 9.85 | 9.85 | 9.85 |
| Depth of water in casing, inches | 54 | 57 | 52.5 |
| Loss rate before treatment, c.f.d. | 1.31 | 1.17 | 0.81 |
| Parts by weight of emulsion per million parts of water | 1000 | 750 | 1000 |
| Length of treatment, hours | 24 | 22.5 | 19 |
| Treated water penetration, cu. ft. per sq. ft. | 0.73 | 0.64 | 0.37 |
| Depth of penetration (35% porosity), ft. | 2.1 | 1.8 | 1.1 |
| Amount of chemical treatment lbs. of suspension per sq. ft. | 0.046 | 0.030 | 0.023 |
| Loss rate at end of treatment, c.f.d. | 0.61 | 0.53 | 0.46 |
| Loss rate 16 hours after treatment, c.f.d. | 0.54 | 0.42 | 0.50 |
| Loss rate 6 days after treatment, c.f.d. | 0.24 | 0.18 | 0.29 |
| Reduction in loss rate, percent | 87 | 85 | 64 |
| Method of erosion | (1) | (2) | (3) |
| Loss rate immediately after erosion test, c.f.d. | 1.05 | 0.28 | 0.28 |
| Loss rate 4 days after erosion test, c.f.d. | 0.43 | 0.18 | 0.22 |

[1] Pole & pump jet.  [2] Pump jet.  [3] None—control.

Example 11

A full scale application of the emulsion material used for Examples 8, 9 and 10 was made in an 8.05 mile section of the Coachella Canal, Imperial County, California. This canal has a wetted perimeter of 80 feet, from which the area of soil treatment was calculated to be 3,400,000 square feet. The rate of loss as determined by inflow-outflow measurements varied from 0.7 to 2.4 c.f.d. with the flow varying from 311 to 1100 cubic feet per second. The oil-in-water emulsion was added to the water at the head of the section while the water was flowing at a rate of 440 cubic feet per second. A total of 306,620 pounds of the oil-in-water emulsion was used, representing a calculated addition at the rate of 391 parts per million parts of water by weight. The material was added over a period of ten hours, and was then allowed to remain in contact with the bottom and sides of the canal for another forty hours by damming up the ends of the section. A water level recorder had been placed in a well adjacent to the canal prior to treatment. The water level in the well before treatment was the same as in the canal, thus showing a high seepage rate through the walls of the canal into the well. After treatment the recorder indicated a steady decline in the water level in the well and after six days the water level in the well was twelve inches below the water level in the canal thus showing that the seepage from the canal was substantially reduced. The final inflow-outflow measurements are not yet available, but present information indicates that a satisfactory seal developed.

Example 12

A potato field having irrigation ditches or furrows formed therein between rows of potato plants was treated in an area of three adjacent furrows, according to this invention. Such treatment consisted of adding an oil-in-water emulsion of the composition used in Example 8 to the water being supplied to the furrows to give a concentration of 1000 parts by weight of emulsion per million parts of water, as specified in Example 8. Inspections in the field were made over a period of five weeks following treatment, throughout the first half of which period the entire field was irrigated with untreated water every other day and sometimes with water containing fertilizer. After the irrigation period, the field was allowed to dry up for harvesting purposes. It was noted about three weeks after the time of treatment that the plants in the treated area were more vigorous and greener than those in the untreated area, thereby showing that the materials used in the treatment were not toxic to the plants, and that the fertilizer which had been added to the irrigation water was not leached out from the soil away from the roots of the plants. Following the end of the irrigation period, it was noted that the soil in the untreated area dried up in about four days, whereas in the treated area the soil remained moist to a depth varying to about one foot and continued to be moist, though gradually drying up to the time of harvest. At harvest time the soil in the treated area was less compact and was easy to break up, whereas in the untreated area the soil was hard and dry and contained a noticeable amount of large clods which hindered the digging operations. Then, too, it was apparent that the potatoes from the treated area were denser than those harvested from the untreated area.

Example 13

A lawn planted in sandy soil was treated with the oil-in-water emulsion which had been produced commercially and used in Example 8 above. Before treatment, daily watering was necessary to keep the lawn alive, and the leaching out of fertilizers by the constant watering made the fertilizers ineffective. A commercial fertilizer was spread on the lawn, and one quart of the oil-in-water emulsion was applied to each 300 square feet area of lawn using a commercially available garden sprayer applied to the end of a garden hose. Within three weeks, the lawn appeared to be considerably greener and it needed watering only twice a week instead of the daily watering before treatment. Neighbors who were not informed of the test began to inquire as to what had been done to the lawn for the lawn was now growing much better than the neighbors' lawns. After four months time the lawn growth continued greatly stimulated. Another plot of lawn was treated using the oil-in-water emulsion in which ammonium hydroxide constituted the alkaline agent, thereby to eliminate the need for separate application of fertilizer. Similar advantageous results were observed.

From the above, rough proportions for the several ingredients of the emulsions of this invention may be stated as being one part of organic acid emulsifier to about ten parts of the petroleum hydrocarbon oil for the water-in-oil emulsion, and in view of the relatively large proportions of oil and of water, herein roughly considered to be about equal, in the oil-in-water emulsion, the proportions of the emulsifier and of the polymer may be considered as about three to one.

The term "waterway" as used in this specification and in the appended claims means surface canals, streams, ditches, lakes, ponds, and reservoirs for conveying and/or storing surface water for industrial, domestic and agricultural purposes.

It will be understood that it is intended to cover all changes and modifications of the examples of the invention herein chosen for the purpose of illustration which do not constitute departures from the spirit and scope of the invention.

What we claim is:

1. An oil-in-water emulsion for treating the soil bed of a waterway, said emulsion comprising water, and in rough proportions about one part by weight of water soluble polymer salt, said polymer salt being a linear hydrocarbon chain polymer having a molecular weight greater than 10,000 and containing carboxylic acid salt groups selected from the group consisting of the alkali metal and ammonium salts in a ratio of one carboxylic acid salt group to each two to six linear carbon atoms, about three parts by weight of an organic acid selected from at least one of the group consisting of $C_{16}$–$C_{18}$ fatty acids and rosin acids, about thirty parts by weight of petroleum hydrocarbon oil, and about one part by weight of an inorganic alkaline agent.

2. The emulsion of claim 1 wherein there are 48 to 60 parts by weight of water, 0.3 to 1.7 parts by weight of a water soluble polymer salt, 3 to 5 parts by weight of an organic acid, 38 to 40 parts by weight of petroleum hydrocarbon oil, and 0.3 to 0.5 part by weight of an inorganic alkaline agent.

3. An oil-in-water emulsion for treating the soil bed of a waterway, said emulsion being prepared by a process comprising admixing 7 to 8 parts by weight of an organic acid selected from at least one of the group consisting of $C_{16}$–$C_{18}$ fatty acids and rosin acids, with 84 to 87 parts by weight of petroleum hydrocarbon oil and neutralizing the resultant admixture by admixing therewith a water solution containing 6 to 7 parts by weight of water and 0.8 to 0.9 part by weight of an alkaline agent to produce a water-in-oil emulsion, admixing about 100 parts by weight of water with a measurable amount of less than about 3 parts by weight of a water soluble polymer salt, said polymer salt being a linear hydrocarbon chain polymer having a molecular weight greater than 10,000 and containing carboxylic acid salt groups selected from the group consisting of the alkali metal and ammonium salts in a ratio of one carboxylic acid salt group to each two to six linear carbon atoms to produce a polymer-water solution, adding about 7 parts by weight of said water-in-oil emulsion to about 8 parts by weight of said polymer-water solution to produce said oil-in-water emulsion.

4. The composition of claim 1 in which said oil is selected from the group consisting of kerosene, diesel oil and lube stock, said organic acid is abietic acid, and said alkaline agent is sodium hydroxide.

5. The composition of claim 1 in which said organic acid is tall oil.

6. The composition of claim 1 in which said polymer is sodium polyacrylate.

References Cited by the Examiner

UNITED STATES PATENTS

| | | |
|---|---|---|
| 2,759,902 | 8/1956 | Glaudi-Magnussen et al. 260—27 |
| 3,016,713 | 1/1962 | Deming _____ 260—29.6 |
| 3,055,853 | 9/1962 | Pickell _____ 260—23 |

OTHER REFERENCES

Kirk et al.: "Encyclopedia of Chemical Technology," (1950), vol. 5, pages 692, 693, 701, 709.

LEON J. BERCOVITZ, *Primary Examiner.*

R. A. WHITE, *Assistant Examiner.*